United States Patent [19]

Tanizoe et al.

[11] 3,949,175
[45] Apr. 6, 1976

[54] AUDIO SIGNAL TIME-DURATION CONVERTER

[75] Inventors: Toshio Tanizoe, Hitachi; Takashi Kubota, Katsuta, both of Japan

[73] Assignee: Hitachi, Ltd., Japan

[22] Filed: Sept. 25, 1974

[21] Appl. No.: 509,070

[30] Foreign Application Priority Data
Sept. 28, 1973  Japan.............................. 48-108400
Sept. 28, 1973  Japan.............................. 48-108401

[52] U.S. Cl. ...................... 179/15.55 T; 340/173 R
[51] Int. Cl.² ......................................... G11B 13/00
[58] Field of Search....... 179/1.5 H, 15.55 T; 360/8, 360/32; 340/173 R

[56] References Cited
UNITED STATES PATENTS

| | | | |
|---|---|---|---|
| 3,104,284 | 9/1963 | French et al................ | 179/15.55 T |
| 3,621,150 | 11/1971 | Pappas................................ | 360/32 |
| 3,752,912 | 8/1973 | Oshawa et al................ | 179/15.55 T |
| 3,803,363 | 4/1974 | Lee.............................. | 179/15.55 T |
| B262,287 | 1/1975 | Yoshino et al.......................... | 85/22 |

*Primary Examiner*—Kathleen H. Claffy
*Assistant Examiner*—E. S. Kemeny
*Attorney, Agent, or Firm*—Craig & Antonelli

[57] ABSTRACT

An audio signal time-duration converter comprises a random access memory. The compression and expansion of input signals is effected by designating an address in the random access memory and assigning the designated address to a write mode or read mode. The address designation is effected either from an output from a write address counter which serves to count write clock pulses or an output from a read address counter which serves to count read clock pulses. However, in the event of overlap of the read and write clock pulses, the outputs are controlled exclusively by the write clock pulses. In addition, the time duration of the read and write clock pulses is made to be different so that both operations are ensured in a sequential manner in case of such overlap.

10 Claims, 4 Drawing Figures

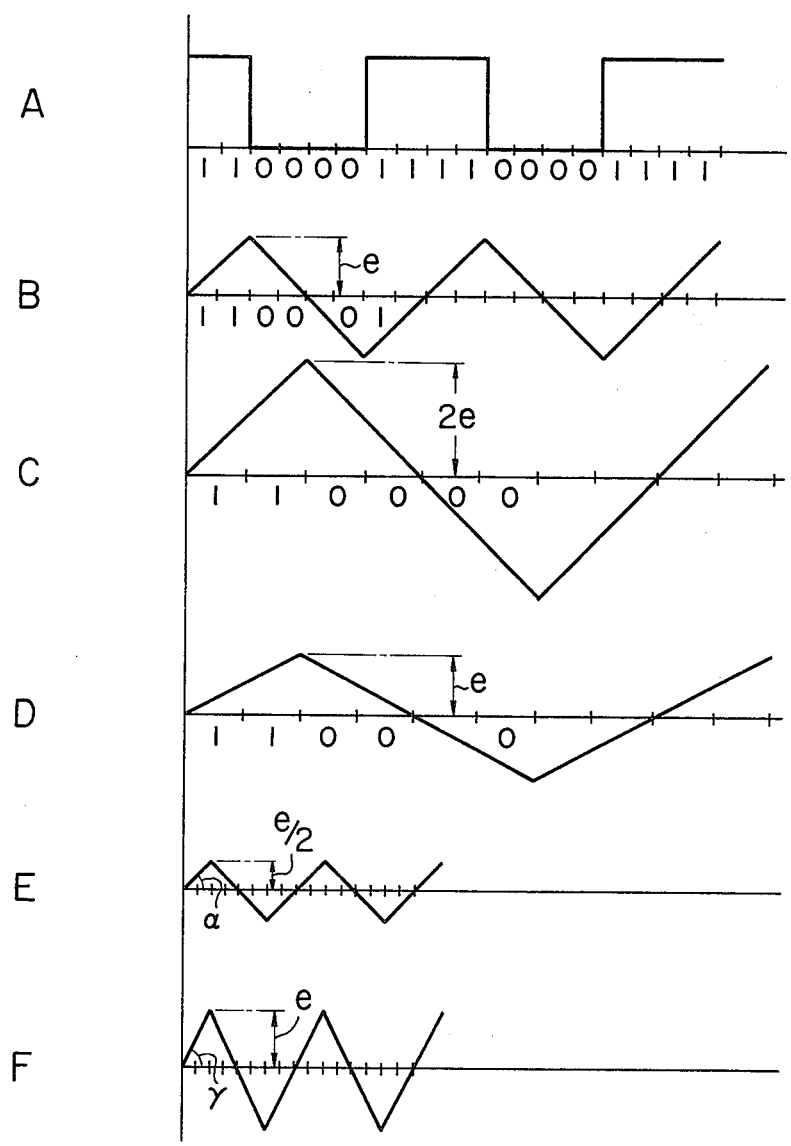

AUDIO SIGNAL TIME-DURATION CONVERTER

BACKGROUND OF THE INVENTION

1. Field Of The Invention

This invention relates to an audio signal time-duration converter for compressing and expanding the timing of an audio signal.

2. Description Of The Prior Art

When an audio signal recorded at normal speed in, say, the magnetic tape of a tape recorder is reproduced at a speed higher than the normal speed, the reproduction time is shortened while at the same time the frequency band of the voice is accordingly increased. The reproducing of the signal at a speed lower than the normal speed, on the other hand, causes the reproduction time to be expanded, reducing the frequency band of the voice. Therefore, in order to restore the frequency band of the signal to the normal audio frequency band, it is necessary to change the speaking speed, that is, the tempo without adversely affecting the pitch, timbre or the intelligibility of the voice.

The conventional device for conversion of an audio signal frequency band for similar purposes, as disclosed in U.S. Pat. No. 3,621,150, comprises a pair of shift registers in which input audio signals are alternately written at a predetermined sampling rate, while the contents of the registers not in a storage state are read at a rate different from the sampling rate thereby to effect the expansion and compression of the frequency band of the input audio signals. In such a device, two memory means are used as storage means. According to the present invention, by contrast, there is provided a random access memory means in which audio signals are written at a predetermined rate while the contents thereof are read at a different rate.

If a random access memory means is to be made most of, however, there are a number of problems to be overcome. One of the greatest problems is the fact that it is impossible to designate an address for a write operation and an address for a read operation at the same time. Instead, it is necessary to give priority to either the write or the read operation in designating an address. Further, this designation must be effected easily, accurately and reliably.

Also, in view of the fact that write clock pulses and/or read clock pulses for write and read operations respectively vary in their rate according to the reproducing speed of the magnetic tape, the relative changes in the rate of write and read clock pulses must preferably be accomplished easily.

Since the output of the random access memory means is produced both at the time of writing and reading, a read signal produced at the time of reading contains a write signal, that is, unneccessary data. This data should preferably be strobed and it is also preferable to regulate its time width.

In a conventional apparatus an analog-digital (A-D) converter, such as a converter of the pulse code modulation (PCM) type, is used to obtain digital signals written in the random access memory means. The apparatus according to the invention, however, employs a low-cost and simple delta modulator in place of the expensive and complex PCM converter. A digital-analog (D-A) converter is used to convert into an analog signal a digital signal read from the random access memory means. Comparison of the input audio signal to the delta modulator with the output audio signal of the D-A converter shows that the level of the output audio signal changes relative to the input audio signal depending on the changes in tape speed. The input and output level therefore must be adjusted for each change in input and output levels. The reduction in output or input level poses no problem as the gain of the amplifier is improved. When the level rises, however, the signal-to-noise ratio of the amplifier is deteriorated. Therefore, preferably, the levels of input audio signal and output audio signal should substantially remain unchanged against the variations in tape speed.

Also, the output of the delta modulator, the dynamic range of which is narrow, is deteriorated in signal-to-noise (S/N) ratio at an improper input level, thus making it necessary to maintain the input level almost constant.

SUMMARY OF THE INVENTION

Accordingly, it is an object of the present invention to provide a practical audio signal time-duration converter which is capable of designating an address in the random access memory means.

Another object of the invention is to provide an audio signal time-duration converter which is easily capable of changing the rates of write clock pulses and read clock pulses.

Still another object of the invention is to provide an audio signal time-duration converter which strobes undersirable data contained in the output of the random access memory means.

A further object of the invention is to provide an audio signal time-duration converter in which the level or amplitude of the input audio signal of the delta modulator and the output audio signal of the D-A converter remains substantially unchanged against the variations in reproducing speed of magnetic tape.

A further object of the invention is to provide an audio signal time-duration converter in which the level of the audio signal input to the delta modulator is maintained substantially constant. In accordance with the foregoing objects, the present invention provides an audio signal time-duration converter in which write clock pulses are generated at a selectively variable rate which can be higher, lower or the same as the rate at which read clock pulses are generated. In view of the use of a random access memory in the system, two steps are taken to accommodate the possibility that the write and read clock pulses may be generated simultaneously or otherwise overlap from time to time. First of all, the system operates to give precedence to the write clock pulse in the control of the memory so that the read clock pulse will be temporarily ignored if the two pulses are generated simultaneously or overlap. Secondly, the time duration of the read clock pulses is made to be greater than the time duration of the write clock pulses so that in the case of overlap of the two clock pulses, the read clock pulse will exert its control over the memory immediately before and/or after generation of the write clock pulse thereby providing for both read and write operations in an interlaced manner.

BRIEF DESCRIPTION OF THE DRAWING

FIGS. 3 and 4 show waveforms for explaining the operation of the converter according to the invention.

DETAILED DESCRIPTION OF THE PREFERRED EMBODIMENTS

Figure 1:
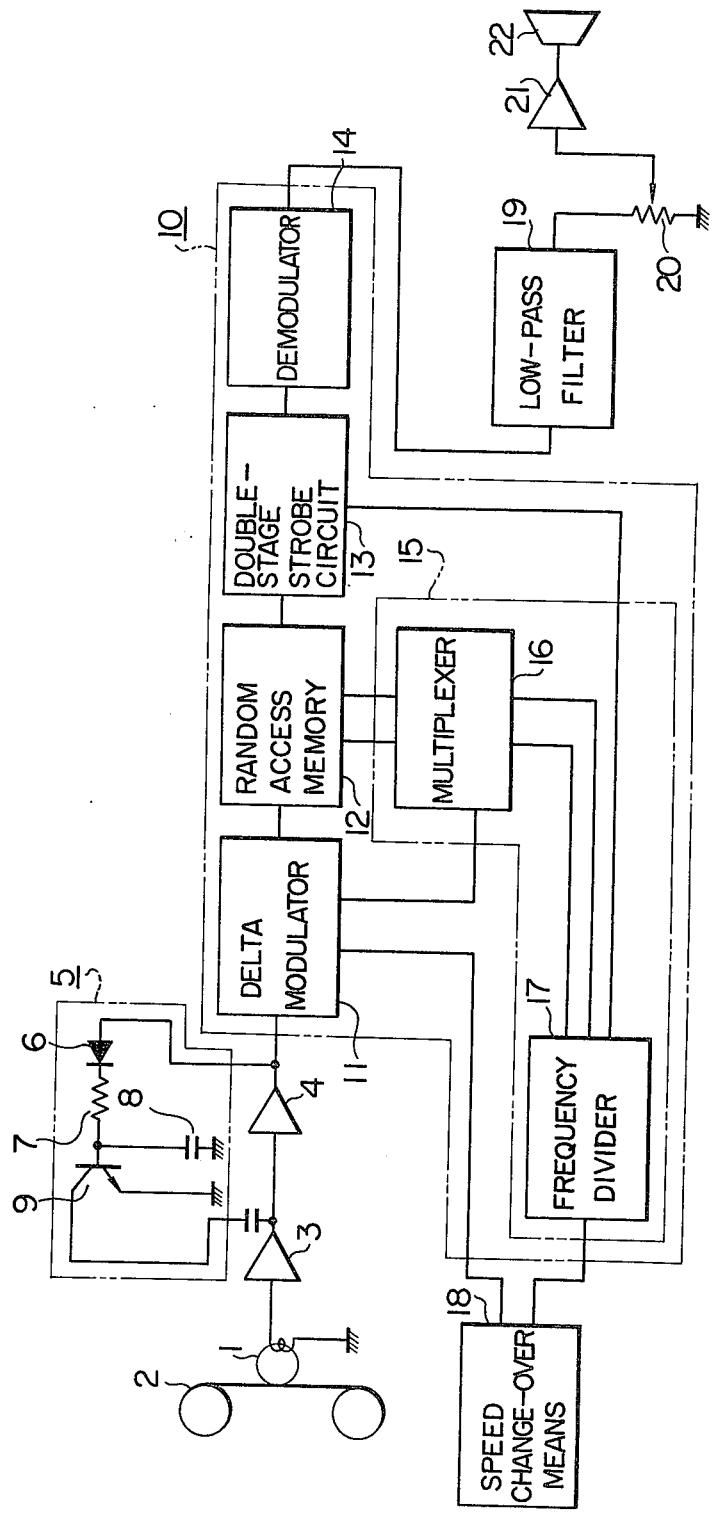
FIG. 1 is a block diagram showing the construction of the audio signal time-duration converter according to the invention.

Referring to FIG. 1 showing the construction of the audio signal time-duration converter according to the invention, reference numeral 1 shows a magnetic head for reproducing an audio signal or analog signal from a magnetic tape 2, numeral 3 a preamplifier for amplifying the audio signal from the magnetic head 1, numeral 4 an amplifier for optimizing the input level to a voice processing section, and numeral 5 an automatic gain control circuit including a diode 6, a resistor 7, a capacitor 8 and a transistor 9. Numeral 10 shows a time compression-expansion circuit including a delta modulator circuit 11 comprised of an A-D converter, a random access memory means 12, a double-stage strobe circuit 13 for output control of the random access memory means 12, a demodulator 14 comprised of a D-A converter and a control means 15. The control means 15, in turn, comprises a clock counter-multiplexer-and system timing circuit 16 and a pulse generator and frequency divider circuit 17. Numeral 18 shows a speed change-over means which is capable of switching the tape speed, the clock pulse frequency dividing rate and the time constant of the internal demodulator of the delta modulator 11 at the same time. Numeral 19 shows a low-pass filter, numeral 20 an output volume control, numeral 21 an output amplifier, and numeral 22 a speaker.

In this circuit arrangement, when the magnetic tape 2 in which an audio signal is recorded is subjected to a reproducing operation with a lower speed than at the recording time, the frequency of the audio signal reproduced at the magnetic head 1 is reduced. This audio signal is amplified by the amplifiers 3 and 4 and applied to the delta modulator 11 of the time compression-expansion circuit 10 where it is converted into a digital signal. The signal thus converted is written temporarily in the memory 12 by means of clock pulses with a frequency proportional to the tape feed rate, and after that, read out by means of read clock pulses of a fixed frequency regardless of tape feed rate. This digital signal is converted into an analog signal by the demodulator 14 and applied through the low pass filter 19, through the amplifier 21 to the speaker 22. The audio signal from the speaker 22 is slower in speed than but has the same audio frequency as at the time of recording. The same sequence for conversion is followed in the case of a tape feed acceleration signal as in the case of decelerated reproduction, so that the reproduced audio signal is higher in speed than but has the same audio frequency as at the time of recording.

Figure 2:
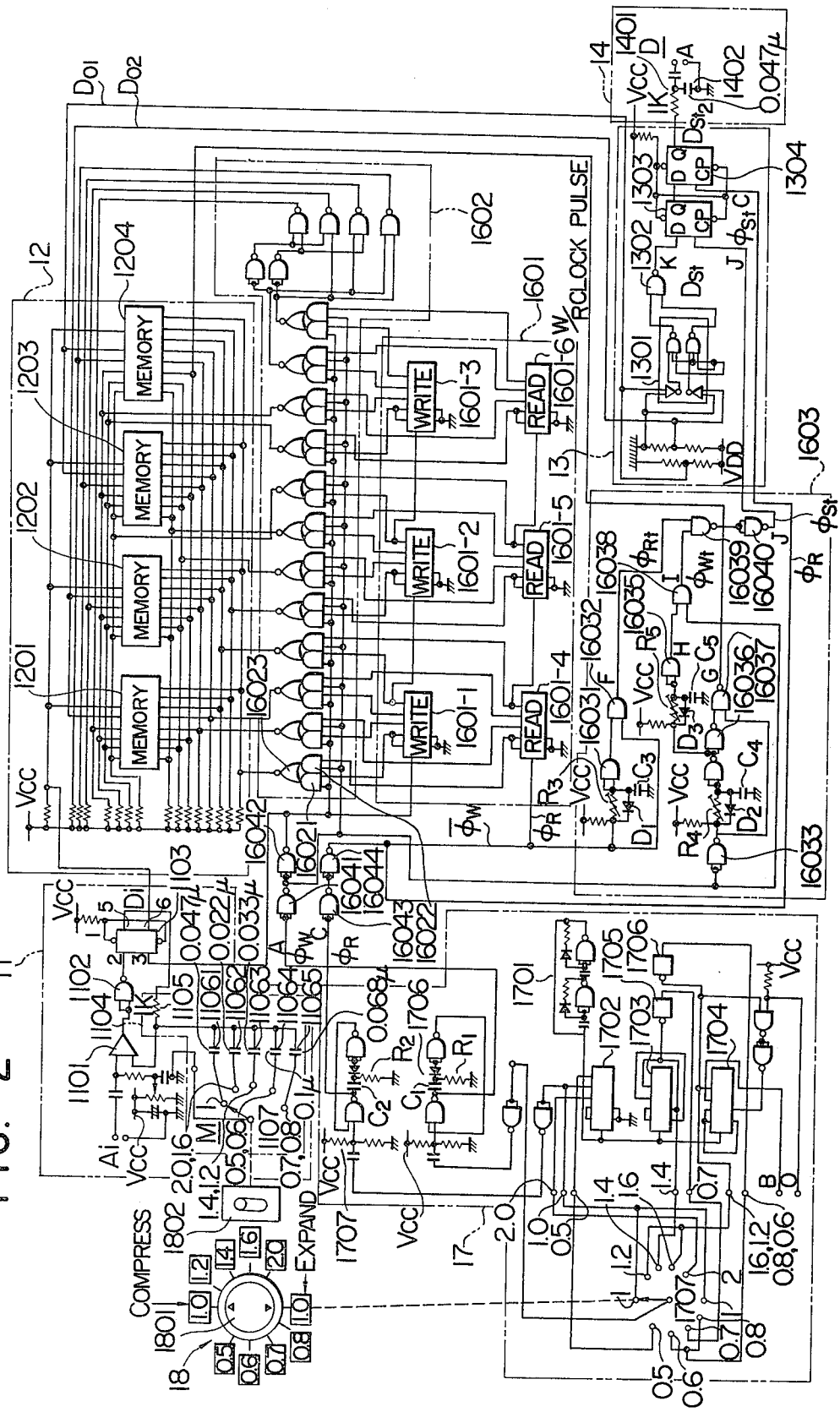
FIG. 2 is a circuit diagram showing an actual example of the construction of the audio signal time-duration converter according to an embodiment of the invention.

The circuit diagram of FIG. 2 shows an embodiment of the invention illustrating an actual example of the audio signal time converter.

Explanation will be made first of the delta modulator 11 which is an A-D converter. The delta modulator 11 comprises an analog signal comparator 1101, an inverter or NAND gate circuit 1102, a flip-flop 1103 and an internal demodulating integrator 1104. The operation of this delta modulator 11 is such that an analog signal or audio signal is applied to one of the inputs of the comparator 1101 and an output of the internal modulating integrator 1104 is applied to the other input thereof. They are compared by and produced from the comparator 1101 in the form of a digital output "0" or "1". The output from the comparator 1101 is shaped in waveform by the inverter 1102. Since the digital output of the inverter 1102 contains an unstable portion associated with equal differences between the inputs, the flip-flop 1103 is provided for the purpose of removing such an unstable portion by strobing. A signal in synchronism with the clock pulse $\phi_W$ at the rise time thereof is sampled and applied as a digital signal to the random access memory from the output $D_i$. At the same time, a similar digital signal with opposite phase is applied to the internal demodulating integrator 1104, where it is reconverted into an analog signal and applied to the comparator 1101 for continued comparing operation.

This digital signal is compressed and expanded by the random access memory means 12 to effect compression and expansion of an audio signal. The memory means 12 comprises four memories 1201, 1202, 1203 and 1204 each having a plurality of addresses in which pulses of logic "1", "0", "1" and "0" are written in that order at the speed of the write clock pulses $\phi_W$. Even though the time conversion can not be achieved by a read operation at the same speed as the write operation with read pulses $\phi_R$, a slower read operation will result in successful expansion. On the other hand, reading at a higher speed will cause a compression on the fundamental principle.

The read clock pulses $\phi_R$ and write clock pulses $\phi_W$ are generated by the pulse generator 17 comprising a master oscillator 1701, a plurality of dividers 1702 to 1706 and a switch 1707. The master oscillator 1701 is an astable multivibrator generating a master frequency $\phi_0$ of a rectangular wave of 1.2 MHz, so that the master frequency $\phi_0$ of the multivibrator 1701 is divided into 9 types of frequencies $\phi_0/4$, $\phi_0/5$, $\phi_0/6$, $\phi_0/7$, $\phi_0/8$, $\phi_0/10$, $\phi_0/12$, $\phi_0/14$ and $\phi_0/15$ by means of dividers 1702 to 1706. Among these frequencies, $\phi_0/8$ is determined as a read clock pulse and one of the nine types of signals is selected as a write clock pulse by the switch 1707. It is here assumed that the frequency of $\phi_0/8$ which is the same as the read clock pulse is determined as a frequency used for reproduction at the normal speed, that is, the speed the same as at the time of recording of the magnetic tape and expressed in numeral 11. So, the frequencies of $\phi_0/7$, $\phi_0/6$, $\phi_0/5$, and $\phi_0/4$ are 1.14 times, 1.33 times, 1.6 times and 2.0 times the frequency of $\phi_0/8$ and expressed in 1.2, 1.4, 1.6 and 2.0 respectively. Similarly, the frequencies of $\phi_0/10$, $\phi_0/12$, $\phi_0/14$ and $\phi_0/16$ are 0.8, 0.66, 0.57 and 0.5 times the frequency of $\phi_0/8$ and therefore expressed as 0.8, 0.7, 0.6 and 0.5 respectively. One of these indications is selected by the switch 1707 operatively interlocked with the knob 1801 and change-over switch 1802. When the change-over switch 1802 is closed on COMPRESS side, 1, 1.2, 1.4, 1.6 or 2.0 may be selected by the rotation of the knob 1801. If the change-over switch 1802 is closed to EXPAND side, on the other hand, the rotation of the knob 1802 enables selection of 1, 0.8, 0.7, 0.6 or 0.5. The reproducing speed of magnetic tape is also changed by the numerical indications around the knob 1801 with the rotation thereof as interlocked with the change-over switch 1802. The write clock pulse is converted into the pulse $\phi_W$ with logic 1 of about 2μs through the monostable multivibrator 1706, the pulse width of the logic 1 being determined by the time constant due to the resistor $R_1$ and capacitor $C_1$. This pulse width is therefore fixed. The read clock pulse, by contrast, is converted by another monostable multivibrator 1707 into a pulse $\phi_R$ with ligic 1 of about $4\mu s$.

The random access memory shown in the drawing consists of MK4008P (manufactured by Mostek Company of U.S.A.) and comprises counter means 1601 for designating an address in the memory means 12. The counter means 1601 includes write address counters 1601-1, 1601-2, 1601-3 and read address counters 1601-4, 1601-5 and 1601-6. Upon arrival of each logic 1 of the pulse $\phi_W$, the counters 1601-1, 1601-2 and 1601-3 begin to count from 1 sequentially and upon completion of the counting, return to 1. The counters 1601-4, 1601-5 and 1601-6 count logic 1 of pulse $\phi_R$ each time of arrival thereof. The random access memory means 12 is unable to perform the operation of address designation by the write address counter and the read address counter at the same time. Therefore, a multiplexer means 1602 acts to either write or read instruction to the memory means 12 and comprises a number of multiplexers each including a couple of AND gates 16021 and 16022 and a NOT circuit 16023.

The write clock pulse $\phi_W$ and read clock pulse $\phi_R$ are applied through one or two of the NAND gates 16041, 16042, 16043 and 16044 to the multiplexers. Assuming that logic 1 (high) of pulse $\phi_W$ is applied to one of the input terminals of the AND gate 16021, the logic 0 (low) of pulse $\phi_W$ is applied to one of the input terminals of the AND gate 16022. As a result, only the output signal from the write address counter which is applied to the other input terminal of the AND gate 16021 is applied through the NOT circuit 16023 to the random access memory means 12. Next, assuming that logic O of the pulse $\phi_W$ is applied to one of the input terminals of the AND gate 16021, the logic 1 of pulse $\phi_W$ is applied to one of the input terminals of the AND gate 16022, so that only the output signal from the read address counter which is applied to one of the input terminals of the AND gate 16022 is applied through the NOT circuit 16023 to the random access memory means 12. In this way, an address in the random access memory means is designated by the output signal from the write address counter at the time of logic 1 of pulse $\phi_W$, while address designation in the random access memory 12 is made by the output signal from the read address counter in the case of logic 0 of the pulse $\phi_W$. In addition to the adddress designation, write mode or read mode must be designated. In the embodiment under consideration, the write or read pulse is generated by a timing circuit 1603.

Figure 3:
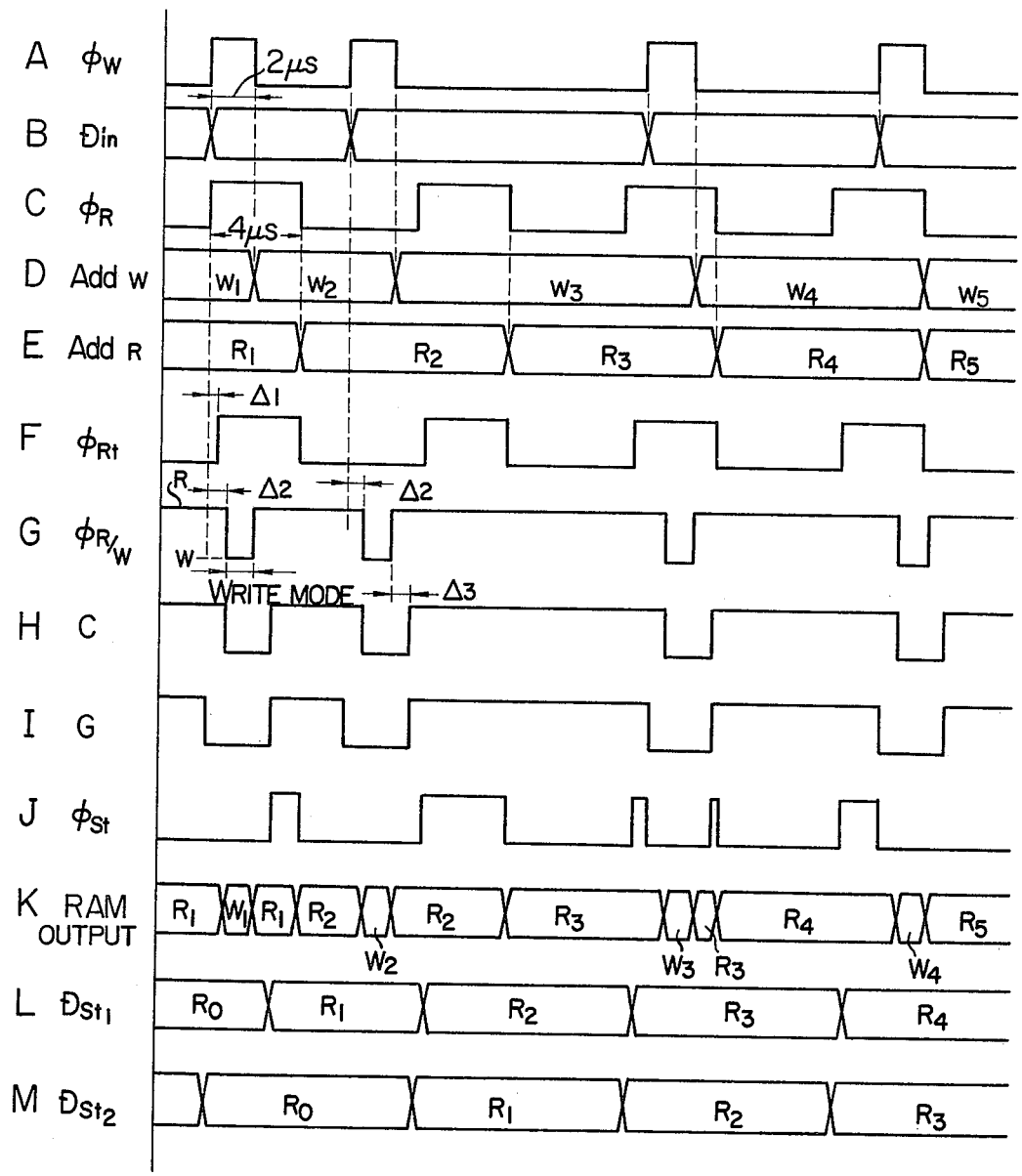

The timing circuit 1603 includes AND gates 16031, 16032, 16035 and 16038 and NAND gates 16033, 16034, 16036, 16037 and 16039. The operation of this circuit will be understood from FIG. 3. First, A of FIG. 3 shows the write clock pulse, which is so formed that the input data Din of the memory 12 changes as shown in B at the positive edge of the pulse $\phi_W$. The read clock pulse $\phi_R$ is shown in C. The write address mode signal of D is so determined as to change to the next successive address at the negative edge of the write clock pulse $\phi_W$. In E of FIG. 3 showing the read address signal, on the other hand, a change is made to the next successive address at the negative edge of the read clock pulse $\phi_R$.

The read clock pulse $\phi_R$ applied to one of the input terminals of the AND gate 16031 of FIG. 2 is delayed by $\Delta 1$ in its rise due to the integration constant attributable to the resistor $R_3$ and capacitor $C_3$ on the input side of AND gate 16032. Since the other input to the AND gate 16032 is pulse $\phi_R$, the output as shown in F of FIG. 3 is produced by the AND gate 16032. On the other hand, the pulse input to the NAND gate 16033 is the pulse $\phi_W$ that has passed through the NAND gate 16041, and therefore the NAND gate 16033 produces an output pulse $\phi_W$. This pulse $\phi_W$ is delayed by $\Delta 2$ in its rise due to the integration constant of the next resistor $R_4$ and the capacitor $C_4$ and inversed by the NAND gate 16034 into the pulse shown in G of FIG. 3. Part of the output from the NAND gate 16034 is inversed again by the NAND gate 16036 and further into G of FIG. 3 by the NAND gate 16037 taking advantage of the output of the NAND gate 16033. This inversed pulse G is used as a write or read clock pulse. In this signal, logic 1 and logic 0 represent "read mode" and "write mode" respectively. The reason why the negative edge is lagging by $\Delta 2$ is that the introduction of a write mode of the memory means 12 used in the embodiment under consideration requires a read period of $0.5 \mu s$ or longer. This requirement of the lagging negative edge, however, depends on the memory means employed. Thus, designation of both addresses of the random access memory means and "write mode" or "read mode" is facilitated.

The observation of the output of the random access memory means 12 shows that its read signals contain write signals as will be seen from K of FIG. 3. This is because the write signal $W_1$ is passed to the output of the memory means 12, for example, the read signal $R_1$ in K of FIG. 3 during the write mode of the write or read clock pulse G.

These undesirable write pulses $W_1$, $W_2$. . . so on are removed by generating another type of pulse by the timing circuit 1603. The waveform of G in FIG. 3 is delayed by $\Delta 3$ in rise due to the integration constant of the resistor $R_5$, thus producing an output of the AND gate 16035 as shown by H of FIG. 3. This signal is applied to one of the input terminals of the AND gate 16038, the other input being impressed with the reversed waveform of the pulse $\phi_W$, and therefore the AND gate 16038 produces an output as shown in I of FIG. 3, with the result that the output signal as shown in J of FIG. 3 is produced by the NAND gate 16040 through the NAND gate 16039.

Actual elimination of the undesired data $W_1$, $W_2$ and so on is effected by the duouble-stage strobe circuit 13 including a sensor amplifier 1301 for converting the low output level of the memory into a high level. Reference numeral 1302 shows a NAND gate for combining the two outputs of the amplifier 130. The NAND gate 1302 produces an output as shown in K of FIG. 3, so that the outputs K and J are applied to the D type flip-flop 1303. This flip-flop 1303 is inversed and locked at $R_1$ by the positive edge of the pulse $\phi_{st}$ occurring during $R_1$ of the memory output, while it is inversed and locked at $R_2$ by the positive edge of the next pulse $\phi_{st}$, thus producing the read signals without any "write signal" as shown in L of FIG. 3 in the form of output $D_{st1}$ from the flip-flop 1303. The data $R_1$, $R_2$. . . so on have different width, which should preferably be made uniform. For this purpose, another D type flip-flop 1304 is provided with the read clock pulse $\phi_r$ applied thereto, so that the flip-flop 1304 produces data as shown in M of FIG. 3 having the same uniform pulse width as the read clock pulse $\phi_r$.

The data produced as the output from the flip-flop 1304 is converted into an analog signal by the D-A converter 14 comprising a resistor 1401 and a capacitor 1402.

Explanation will be made now of the voltage level or amplitude of the outputs from the integrator 1104 constituting a demodulator for the data modulator 11 and that of the output from the integrator constituting the demodulator 14 for the D-A converter with reference to FIG. 4.

The switch 1107 in the demodulator 1104 (hereinafter referred to as the integrator M) of the modulator 11 is positioned at "1", so that the time constant due to the resistor 1105 and the capacitor 11061 is made equal to that due to the resistor 1401 and capacitor 1402 of the demodulator 14 (hereinafter referred to as the integrator D) in the D-A converter 14. In this condition, observation is made of the analog output waveforms caused when the digital pulse train shown in A of FIG. 4 is applied to the integrators M and D. In the event that the reproducing speed of the magnetic tape is equal to that at the time of recording, that is, $T_v = 1$, both the integrators M and D produce an analog signal with the crest value $e$ as shown in B of FIG. 4, resulting in equal input and output signal-to-noise ratios.

If the reproducing speed of the magnetic tape is reduced as compared with that for recording, that is, when $T_v$ is smaller than unity, however, the digital signal frequency decreases by the reduction ratio. When the decrease is one half, for example, the digital signal frequency of the integrator M is reduced by one half. If the digital frequency of the integrator D is made the same as when $T_v$ is unity, the output as shown in B of FIG. 4 is produced as an output from the integrator D as when $T_v$ is unity, while the crest value of the analog output of the integrator M assumes $2e$ as shown in C of FIG. 4. This indicates that if the input analog signal level of the delta modulator 11 is made equal to that in the case where $T_v$ is unity, the output level of the demodulator 13 is reduced by one half. In the event that the reproducing tape speed is increased twice as compared with that for recording, that is, if $T_v$ is made larger than unity, on the contrary, the output of the integrator M takes value $e/2$ as shown in E of FIG. 4. Therefore, if the input analog level of the delta modulator 11 is made the same as when $T_v$ is unity, the output level of the demodulator 13 is doubled.

In view of the fact that the input and output levels undergo changes by increasing or decreasing the reproducing speed of the magnetic tape, it is necessary to adjust the level of the input and output signal each time of a change in the tape reproducing speed. The downward adjustment of the level poses no problem as the signal-to-noise ratio of the amplifier is improved, but increasing the level for adjustment deteriorates the S/N ratio of the amplifier. Ideally, therefore, the levels of the input and output signals of the time compression-expansion circuit 10 must always coincide with each other. This may be achieved by changing the time constant $\tau_M$ of the integrator M in inverse proportion to the reproducing speed of magnetic tape. For example, when the reproducing speed of the magnetic tape is reduced by one half, the time constant $\tau_M$ is doubled, thus making it possible to render the input level coincide with the output level as shown in D of FIG. 4. When the reproducing tape speed is doubled, on the other hand, the equal input and output levels as shown in E of FIG. 4 are achieved by reducing the time constant $\tau_M$ by one half. For this purpose, there are provided in addition to the capacitor 11061 of the integrator M four capacitors 11062, 11063, 11064 and 11065 with different capacities, one of which is selected by the switch 1107. Since the switch 1107 is operatively interlocked with the speed change-over section 18, the knob 1801 and the change-over knob 1802, the operation of the knob 1801 and knob 1802 permits selection of a capacity inversely proportional to the reproducing tape speed, thus making the time constant of the integrator variable. When the change-over switch 1802 is closed to COMPRESS side and the knob 1801 positioned at "2.0", for example, the capacity of the capacitor 11062 of the integrator M becomes $0.002\mu F$ which is about a half of $0.047\mu F$ of the capacitor 1402. In this way, the input level or amplitude of the A-D converter 11 is made equal to that of the output level of the D-A converter 14. Incidentally, the capacitor 11062 is used also for "1.6" because of substantially no trouble due to a small level difference.

Now, referring to the delta modulator 11, the narrow dynamic range thereof makes it necessary to pay appropriate attention to its input level to maintain a good signal-to-noise ratio. In view of this, the output of the amplifier 4 in FIG. 1 is half-wave rectified by the diode 6, smoothed by the resistor 7 and capacitor 8, and applied to the base of the transistor 9. The resulting change in base potential causes a change in the emitter-collector impedance of the transistor 9, thus changing the input level of the amplifier 4. In other words, when the output level of the amplifier 4 is increased, the impedance between emitter and collector of the transistor 9 is reduced and acts in such a manner as to reduce the input level of the amplifier 4. The output of the amplifier 4 is thus maintained at the effective value 0.5 V where the signal-to-noise ratio of the delta modulator 11 is optimum or almost optimum.

It will be noted from the foregoing description that according to the present invention an address in the random access memory means can be conveniently designated with relative ease for a higher practical value.

Further, the fact that the write clock pulse and read clock pulse making up the base for designating addresses in the random access memory means and determining whether "write" or "read" are formed by dividing the output frequency of the master oscillator permits the ratio between the frequencies of write clock pulses and read clock pulses to be determined regardless of the oscillation frequency of the master oscillator. Also, no specially high precision is required of the frequency of the output of the master oscillator.

Furthermore, since the write signal contained in the output read signal of the random access memory means is strobed, the signal-to-noise ratio is improved. This improvement in S/N ratio is promoted even more by the adjustment of the width of the output pulses.

Another advantage of the apparatus according to the invention is the elimination of the need for level adjustment due to the fact that a uniform level or amplitude is obtained regardless of the reproducing speed of the magnetic tape which might be different from the recording tape speed.

Moreover, an analog signal of a substantially fixed level is applied to the delta modulator and therefore it is possible to maintain an improved signal-to-noise ratio.

What is claimed is:

1. An audio signal time-duration converter comprising an analog-digital converter means for converting an audio signal into a digital signal, random access memory means connected with said analog-digital converter means for storing the output signal of said analog-digital converter during a predetermined write cycle and for reading out the stored data during a read cycle which is different from said write cycle, a digital-analog converter connected to the output of said memory means for converting the output signal of said memory means to an analog signal, first means for generating write clock pulses and read clock pulses at different rates for controlling said memory means, write address counter means connected to said first means for counting the pulse cycle of said write clock pulses, read address counter means connected to said first means for counting the pulse cycle of said read clock pulses, second means connected to said first means, said write address counter means and said read address counter means, and controlled by said write clock pulses for selecting either one of the output signal from said write counter means and the output signal from said read address counter means to apply the selected output signal to said memory means thereby to designate an address in said memory means, third means connected to said first means for generating select clock pulses associated with said write clock pulses, and fourth means for applying the select clock pulses to said memory means to determine the write mode or read mode of the address of said memory means designated by said second means.

2. An audio signal time-duration converter according to claim 1, in which said second means selects the output signal from said write address counter means at the time of logic 1 of said write clock pulse and the output signal from said read address counter means at the time of logic 0, and said third means converts the address designated by said second means into a write mode at the time of logic 1 of said write clock pulse and into a read mode at the time of logic 0 of said write clock pulse.

3. An audio signal time-duration converter according to claim 1, further comprising means for fixing the width of said write and read clock pulses generated from said first means.

4. An audio signal time-duration converter according to claim 1, in which said first means comprises one master oscillator and a plurality of frequency dividers and switches, said frequency dividers dividing the clock pulse generated by said master oscillator into a multiplicity of pulse trains with different frequencies, one of said pulse trains being determined as a read clock pulse, said switches being connected to said dividers for selecting one of the pulse trains including said read clock pulse as a write clock pulse.

5. An audio signal time-duration converter comprising an analog-digital converter for converting an audio signal into a digital signal, random access memory means connected with said analog-digital converter for storing therein the output signal of said analog-digital converter during a predetermined write cycle and for reading the stored data during a read cycle which is different from said write cycle, a digital-analog converter connected with said memory means for converting the output signal of said memory means into an analog signal, first means for generating write clock pulses and read clock pulses at different rates for controlling said memory means, second means connected with said first means for fixing the interval of logic 1 of said write clock pulses and the interval of logic 1 of said read clock pulses while lengthening the interval of logic 1 of said read clock pulse as compared with that of said write clock pulse, write address counter means connected with said first means for counting said write clock pulses read address counter means connected with said second means for counting said read clock pulses, third means connected with said second means, said write address counter means and said read address counter means, and controlled by said write clock pulses for selecting either one of the output signal from said write counter means and the output signal from said address counter means to apply the selected output signal to said memory means thereby to designate an address in said memory means, fourth means connected to said second means for generating select clock pulses associated with said write clock pulses to determine the write mode or read mode of the address of said means designated by said third means, fifth means connected to said second means for comparing a signal associated with the write clock pulse and a signal associated with the read clock pulse, said fifth means producing a specified pulse which is at the state of logic 1 only when both of said signals associated with said write and read clock pulses are in the state of logic 1, and sixth means connected to said fifth means and said memory means for producing only a read signal associated with the read pulse by controlling the output signal of said memory means in response to the output pulse of said fifth means.

6. An audio signal time-duration converter according to claim 1, in which said analog-digital converter constitutes a delta modulator having a first integrator included in a feedback loop thereof, said digital-analog converter constitutes a second integrator, the integration constant of at least one of said first and second integrators being variable as related to the write and read cycles, and said audio signal time converter further comprises means for equalizing the output levels of said first integrator and said second integrator.

7. An audio signal time-duration converter according to claim 6, in which the integration constant of said second integrator is fixed and the integration constant of said first integrator is variable in proportion to the write cycle.

8. An audio signal time-duration converter according to claim 1, in which said analog-digital converter constitutes a delta modulator to which audio signals of substantially the same level reproduced from a magnetic tape is applied.

9. An audio signal time-duration converter according to claim 2, in which said second means comprises a first AND gate, a second AND gate and a NOT gate, one input of said first AND gate being connected to said first means, the other input of said first AND gate being connected to said write address counter means, the output of said first AND gate being connected to one input of said NOT gate, one input of said second AND gate being connected to said first means, the other input of said second AND gate being connected to said read address counter means, the input of said second AND gate being connected to the other input of said NOT gate, the output of said NOT gate being connected to said memory means, whereby said write clock pulses are applied to said one input of said first AND gate and the reversed pulses of said write clock pulses are applied to said second AND gate.

10. An audio signal time-duration converter according to claim 5, further comprises seventh means connected to said sixth means and said first means for producing, from the output signals of said sixth means, pulses having the same uniform pulse width as the read clock pulses.

* * * * *